June 23, 1942.  A. Y. DODGE  2,287,374
HYDRAULIC TORQUE CONVERTER
Filed March 18, 1938   2 Sheets-Sheet 1

INVENTOR.
ADIEL Y. DODGE
BY
McConkey Dawson & Booth
ATTORNEYS

June 23, 1942.   A. Y. DODGE   2,287,374
HYDRAULIC TORQUE CONVERTER
Filed March 18, 1938   2 Sheets-Sheet 2
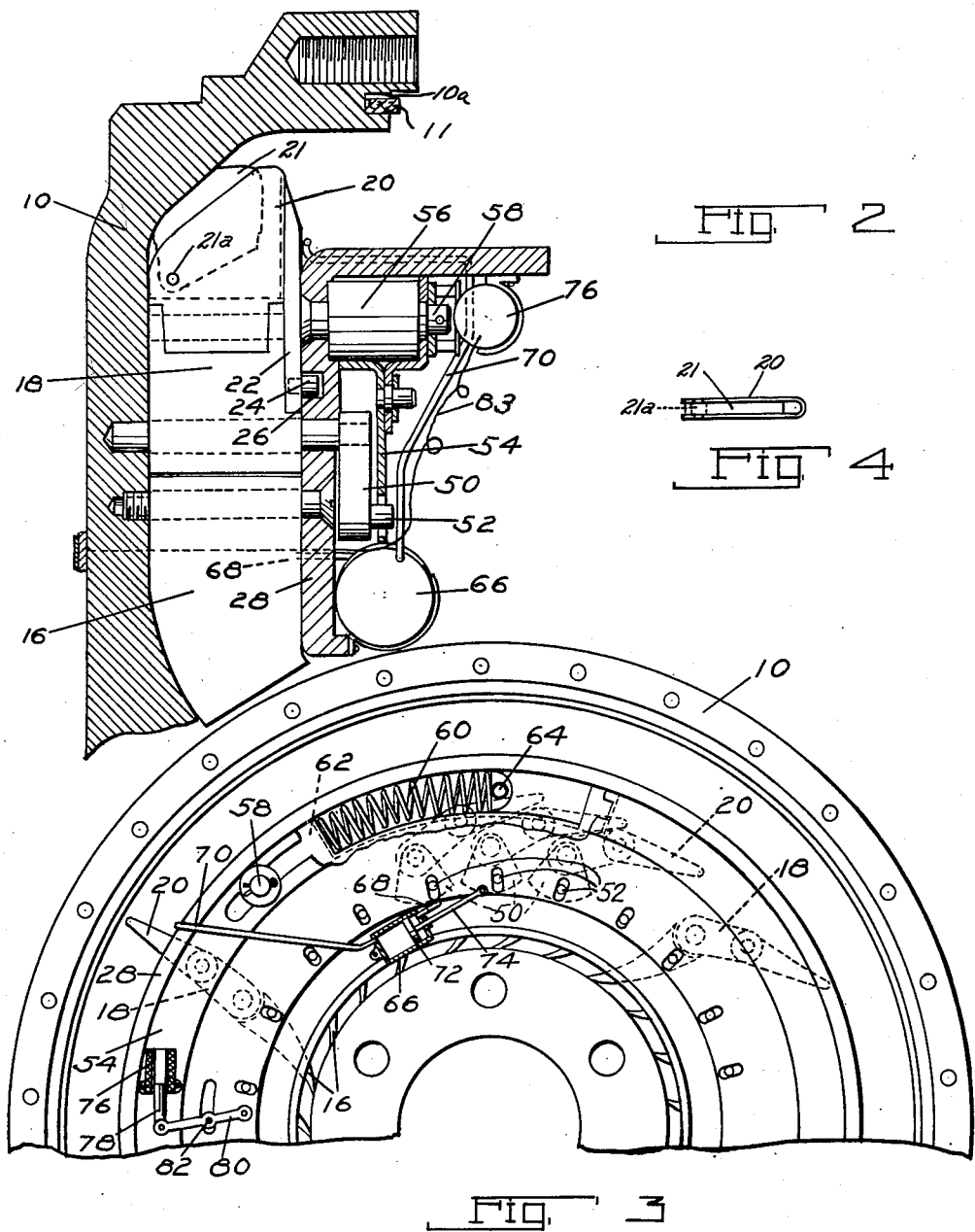
INVENTOR.
ADIEL Y. DODGE
BY McConkey Dawson & Booth
ATTORNEYS.

Patented June 23, 1942

2,287,374

UNITED STATES PATENT OFFICE 2,287,374

HYDRAULIC TORQUE CONVERTER

Adiel Y. Dodge, South Bend, Ind.

Application March 18, 1938, Serial No. 196,712

6 Claims. (Cl. 60—54)

This invention relates to hydraulic torque converters and more particularly to torque converters of the type in which a plurality of vaned elements define a substantially toroidal path in which liquid is circulated to transmit energy from one element to another.

One of the objects of the invention is to provide a hydraulic torque converter which automatically changes gradually to operate as a fluid flywheel.

Another object of the invention is to provide a hydraulic torque converter of the above type in which the automatic change may be modified manually.

In the use of hydraulic torque converters in automobile transmissions or in other places where they are combined with a gear unit including elements shiftable to change the conditions or direction of drive, it is desirable that the torque converter be so arranged as to transmit substantially no torque during shifting. Since shifting always takes place at low speeds this may be accomplished by a unit which will transmit substantially no torque at low speed. Another advantage of this arrangement, particularly in automobile transmissions, is that it eliminates creep when the automobile is stopped without requiring that the gear unit be disconnected or that a separate clutch be provided to interrupt the torque flow.

Accordingly one of the objects of the present invention is to provide a hydraulic torque converter in which substantially no torque is transmitted at low speeds. I have found that this can be done by either or both throttling the circulation of the driving liquid or changing the direction of liquid discharge from the impeller and other objects of the invention relate to a hydraulic torque converter in which liquid flow and direction of discharge from the impeller may be controlled.

In one desirable arrangement the above and other objects of the invention may be accomplished by providing a series of pivoted vanes at the impeller outlet which produce a variable throttling effect on the liquid and which at the same time control the direction of liquid discharge from the impeller. Preferably the vanes are connected to move together and are urged in one direction by centrifugal force on the vanes themselves and on weights connected thereto and are urged in the other direction by reaction of the liquid on the vanes and by springs or the like. By varying the size and angle of the weights and the characteristics of the springs substantially any desired operation can be obtained.

According to other features of the invention the vane control may be modified by providing means responsive to the rate of circulation of the liquid or by mechanism responsive to the speed of operation or both. If desired the last named mechanism may be subject to manual control so as to be effective only when needed under the existing operating conditions.

Another object of the invention is to provide a hydraulic torque converter including movable vanes in which flow of liquid around the vanes is prevented regardless of their position.

Another object of the invention is to provide a novel fluid for torque converters which possesses the necessary characteristics for proper operation.

Other objects, advantages and novel features of the invention will be apparent from the following description of the accompanying drawings, in which:

Figure 2 is an enlarged partial view similar to Figure 1;

Figure 3 is a more or less diagrammatic view of the impeller looking from the right in Figure 1;

Figure 4 is a detail view; and

Figure 5 is a partial vane diagram.

Figure 1:
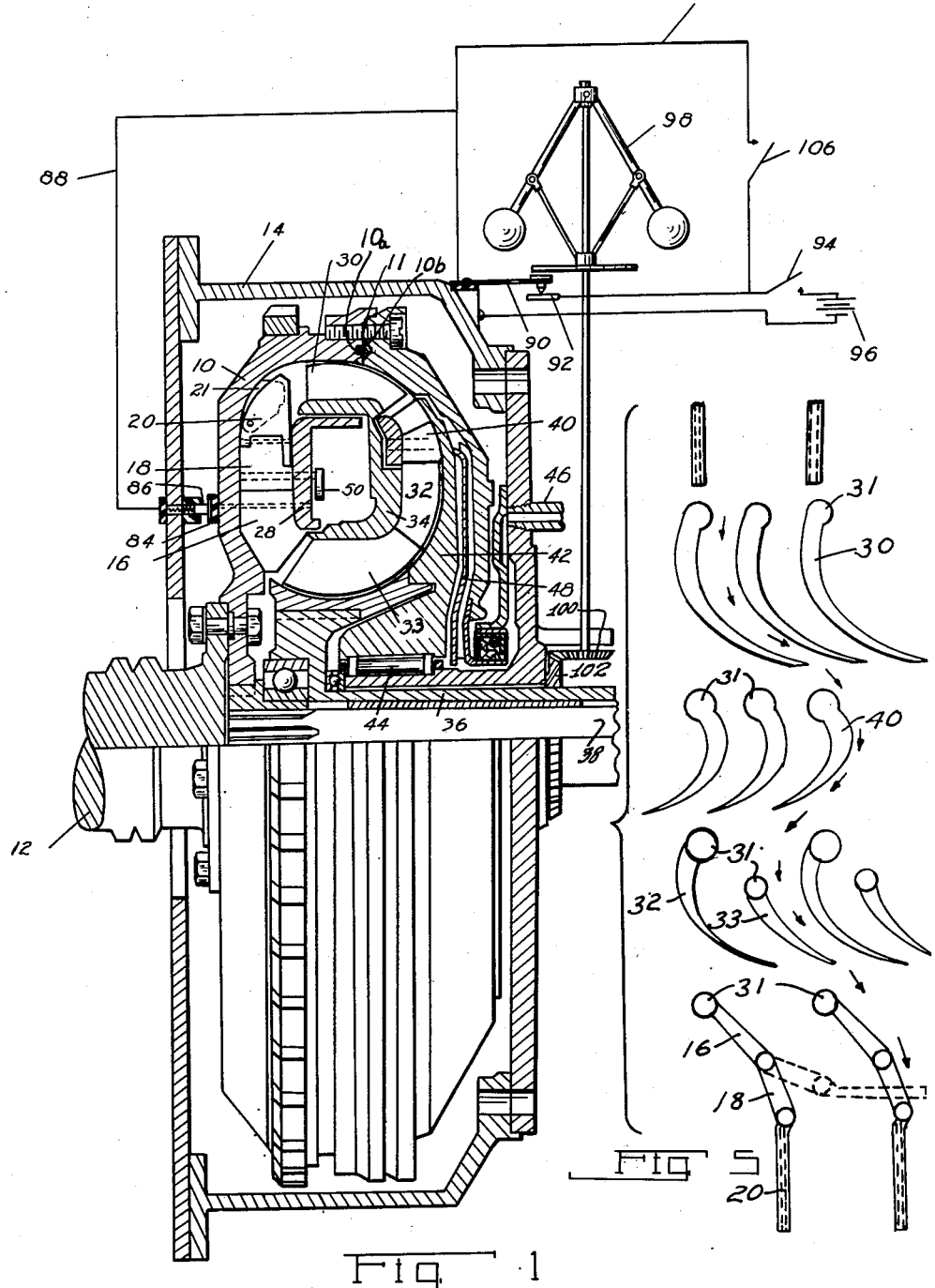
Figure 1 is an axial section with parts in elevation and parts shown diagrammatically of a torque converter embodying the invention.

The illustrated torque converter comprises an impeller casing 10 secured to a driving shaft 12 which may be connected to the crankshaft of an internal combustion engine, the casing 10 being rotatably mounted in a fixed housing 14. The impeller casing carries a set of fixed vanes 16 adjacent the outer ends of which a set of vanes 18 is pivoted. A third set of vanes 20 is pivotally connected to the free ends of the vanes 18 as more fully described and claimed in my Patent No. 2,235,673. As best seen in Figure 2, the vanes 20 are provided with radial extensions 22 carrying pins 24 which are slidable in slots 26 formed in a core member 28 which is rigidly carried by the vanes 16. Thus the position of the vanes 20 is controlled in accordance with the position of vanes 18.

The impeller casing incloses a rotor formed with two sets of vanes 30 and 32 arranged adjacent the impeller outlet and inlet respectively and connected by a core member 34. The rotor is carried by a hub member 36 which is journaled in the housing 14 and which rotatably surrounds an extension 38 of the driving shaft. Between the two sets of rotor vanes there is arranged a set of stator vanes 40 carried by a hub member 42 which is mounted on an extension of the housing 14 by a combined one-way clutch and bearing 44 of the type shown and claimed in my Patent No. 2,113,722. The clutch 44 prevents the stator from rotating rearwardly with respect to the impeller but permits it to rotate forward.

Liquid is circulated through the torque converter through a pipe 46 which communicates with radial passages 48 in the casing 10, the liquid flowing out of the torque converter around the center shaft and serving to lubricate the central bearings as more fully described and claimed in my Patents No. 2,190,830 and No. 2,146,369. If desired the described direction of circulation may be reversed as described and claimed in Patent No. 2,149,117 to Dodge and Allen.

As shown the casing 10 is formed in two parts jointed together by suitable machine screws or bolts and with a packing ring 11 therebetween. The packing ring is an annulus of rectangular section formed of oil resistant synthetic rubber or the like and fits in a rectangular section groove 10a in one of the casing parts which is slightly wider than the normal thickness of the ring. The other casing part has a V-section groove 10b registering with the groove 10a and slightly wider at its mouth. When the casing parts are secured together the ring 11 is deformed to fill the groove 10a completely and to press into the groove 10b substantially filling it. Thus a tight seal is formed between the two halves of the casing 10.

In order to control the pivoted impeller vanes a plurality of weights 50 are provided eccentrically connected to the pivots for the vanes 18. The weights 50 carry pins 52 slidable in slots in a ring 54 which is rotatably mounted on bearings 56 carried by the core member 28, so that all of the weights and consequently all of the pivoted vanes move together. The bearings 56 are mounted on pins 58 which extend through slots in the ring 54 and serve to hold the ring in place while permitting it to have limited rotation.

With the impeller turning in a counterclockwise direction as seen in Figure 3, liquid pressure on the vanes tends to tilt them back to the position shown at the right of the figure. At the same time centrifugal force on the vanes themselves and on the weights 50 tends to turn the vanes radially outward to the position shown at the left of Figure 3 so that the vane position is dependent upon a balance between these forces. When the vanes are tilted back to the position shown they tend to throttle fluid flow and direct the fluid out of the impeller with substantially reduced circumferential component. Thus the fluid from the impeller exerts very little torque on the rotor and driving shaft.

By actual test applicant finds that the torque on the rotor is reduced to less than one-half of what it is with the same vanes locked radial and at the same impeller and rotor speeds; namely 400 R. P. M. of impeller; 0 and 50 R. P. M. of rotor. Of course the engine torque is small at this throttled speed and this plus the above reduces the drag torque to a very small quantity.

As the impeller is speeded up the vanes move out until they form an angle of approximately 45° with a radius which is the maximum rotor torque position or the position of maximum torque multiplication. At this time the fluid is unthrottled and leaves the rotor with large radial component and with a relatively high circumferential component. In its flow through the circuit, the liquid drives the rotor forward and is reversed by the stator, which serves as a fulcrum for torque multiplication.

When the pivoted vanes are moved out substantially to their radial position as shown at the left of Figure 3 fluid is directed out of the impeller with an extremely high circumferential component. With the vanes in this position the action approaches that of a hydraulic clutch, the rotor being driven at substantially the same speed and torque as the impeller and the stator turning forward due to the fact that at this time fluid leaves the rotor vanes 30 with a forward component and strikes the stator vanes on their backs.

Since the centrifugal force on the vanes and weights increases faster than fluid pressure on the vanes, particularly at relatively light loads, I have found that the vanes tend to move out to a radial position too fast so that a condition of high torque multiplication is not maintained as long as desired. In order to balance this effect, there is provided according to the present invention a plurality of springs 60 acting between shoulders on the ring 54 and pins 64 carried by the core member 28. The springs urge the ring counterclockwise as seen in Figure 3 to move the vanes backward and hold the vanes in a high torque multiplying position until a higher speed has been reached. It will be apparent that the spring characteristics can be changed by using springs of different length and different strength to change the vane action as desired and that a further change in characteristic can be made by varying the shape of the slots in the ring through which the pins on the weights pass.

Springs always have a constant straight line characteristic and I have found it desirable to provide supplemental means to modify the spring action so that a variable characteristic may be provided. According to the present invention such means may take the form of a fluid pressure cylinder 66 having a pipe 68 connected to one end and extending into the impeller with its opening facing into the direction of flow and having a pipe 70 connected to its other end and extending into the impeller with its opening facing away from the direction of flow. A piston 72 is slidably mounted in the cylinder with its piston rod 74 connected to the ring 54, the cylinder being secured to the core member 28.

As liquid circulates through the circuit it creates a pressure differential on the pipes 68 and 70 and on the opposite sides of the piston tending to move the ring in a direction to tilt the vanes backward. The pressure differential is variable with the rate of liquid flow which in turn varies with speed and torque conditions so that the piston exerts a force on the ring which is variable in accordance with variations in operating conditions.

As a substitute for the cylinder and piston arrangement or as a supplement thereto to insure a high output torque position of the vanes below a given speed of operation, there may be provided a solenoid coil 76 secured to the ring 54 and having a core 78 pivoted to one end of a lever 80 which is pivoted at its center at 82 on a pin carried by the core member 28 and extending through a slot in the ring 54. The opposite end of the lever 80 is pivoted to the ring 54 so that when the solenoid is energized it tends to turn the ring in a direction to tilt the vanes backward.

One side of the solenoid is grounded to the ring and the other side is connected to a wire 83 which passes through one of the impeller vanes 16 and terminates in a slip ring 84. A brush 86 engages the slip ring and is connected to a wire 88 which is connected to a switch contact 90. A cooperating switch contact 92 is connected through a master switch 94 to one side of a battery 96 whose other side is grounded to the housing 14. The switch contact 90 is adapted to be operated by a governor 98 which is driven through a gear 100 from a gear 102 on the rotor hub 36. Below a predetermined rotor speed the governor 98 closes contacts 90 and 92 but above such speed it moves up and permits contact 90 to spring away from contact 92. A wire 104 controlled by a manual switch 106 is connected in parallel with the switch 90—92 so that the solenoid may be controlled manually if desired independent of the governor.

When the rotor is turning at slow speed the solenoid is energized and urges the ring in a direction to tilt the vanes to high output torque position in opposition to centrifugal force on the vanes and weights. However, after the rotor reaches a predetermined speed the switch 90—92 is opened and the solenoid is deenergized to leave the vanes under the control of the weights, the springs and the cylinder. If it is desired to eliminate the solenoid control the master switch 94 may be opened so that the solenoid will be deenergized at all times. On the other hand if high torque multiplication is desired at high rotor speed the switch 106 may be closed to energize the solenoid and urge the vanes to a high rotor torque position.

Since the interior surface of the impeller housing is curved the outer pivoted vanes 20 tend to move away from it as they pivot, leaving a space through which liquid can flow around the vanes. This gives rise to an appreciable loss of efficiency since the fluid flowing around the vanes is not acted on by the vanes but tends to churn or eddy in the spaces between the vanes.

According to the present invention this drawback is overcome by so forming the vanes as to maintain contact with the housing wall at all times. As best seen in Figures 2 and 4, this may be done by forming the vane 20 of sheet metal or the like folded over on itself in the shape of an elongated U. A supplemental vane 21 is mounted between the opposite sides of the vane 20 and is pivoted thereto at a point 21a closely adjacent the pivotal axis of the vane 20 and toward the outside thereof. The supplemental vane 21 is shaped to fit closely against the impeller casing.

In operation centrifugal force on the vane 21 swings it around its pivot into engagement with the casing wall to close the space left between the wall and the vane 20. As the vane 20 moves the vane 21 will move in or out according to whether the edge of vane 20 moves toward or away from the casing. However, with this arrangement vane 21 is always in contact with the casing and will prevent flow of fluid around the vane 20.

According to another feature of the invention best seen in Figure 5, a plurality of short vanes 33 are arranged between the rotor vanes 32 adjacent the outlet end thereof. When the fluid is moving rapidly through the circuit as during high torque multiplication when the stator is standing still, fluid will leave the stator with a high forward component and will flow with high velocity between the vanes 32 and the vanes 33 immediately behind them. In the passages behind vanes 33a substantially lesser velocity flow takes place. Thus the rotor has the effect of a small area, when the flow velocity is high and the relative tangential velocity between the metal vanes is low.

As the fluid flow from the stator leaves it with a more nearly radial component relative to the rotor, the fluid flows between the vanes 32 on both sides of the vanes 33, with more nearly equal flow velocity. Thus the full area of the rotor is utilized and it has the effect of a relatively large area which is more desirable as the operation approaches that of a fluid flywheel.

Figure 5 illustrates another desirable feature of the invention contributing to smoothness of operation and elimination of shock. As shown, each of the vanes is provided at its entrance edge with a cylindrical portion 31 of slightly greater diameter than the vane width against which fluid entering the vanes first strikes. Since a cylinder presents the same surface regardless of the angle of attack and since a cylindrical surface provides a very highly efficient airfoil shape for a leading edge the liquid will flow over the vanes with a minimum of shock under all conditions.

In torque converter units of the type described, I have found that the capacity for a given size is directly proportional to the specific gravity of the fluid used and that efficiency increases as the viscosity of the fluid decreases. A satisfactory fluid should have a specific gravity of 1.2 or more, a low viscosity, some lubricating value, a high boiling point (300° F. or higher), a low freezing point (—30° F. or less), a minimum tendency to foam when agitated, and should be a metal preservative or at least should not be corrosive. I have found that a staple solution having all of these qualities can be produced by mixing 20% to 40% mineral oil or vegetable oil such as castor oil, 75% to 55% either Chlorex (beta beta dichlor-diethyl ether) or Airchlor (para chlorodiphenyl) and 2% to 10% diphenol amine. The oil gives the mixture lubricating qualities, the Chlorex or Airchlor increases the specific gravity and reduces the viscosity and freezing point and the diphenol amine acts as a neutralizing agent to eliminate any corrosive tendencies. Further the solution is staple and may easily be made from easily obtainable and relatively inexpensive compounds.

Another satisfactory fluid having the desired characteristics may be made by using glycerine in place of the lubricating oil. Preferably from 45% to 50% glycerine is mixed with 45% to 50% Chlorex or Airchlor and from 2% to 10% diphenol amine.

While one embodiment of the invention has been illustrated and described in detail it will be understood that many changes might be made therein and it is not intended that the scope of the invention shall be limited to the form shown or otherwise than by the terms of the appended claims.

What is claimed is:

1. A hydraulic torque converter comprising a vaned impeller and a vaned rotor forming a liquid circuit, a set of relatively fixed vanes at the inlet end of the impeller, a set of eccentrically pivoted vanes at the outlet end of the impeller to change the impeller discharge angle, a plurality of weights eccentrically connected to said pivoted vanes to move the vanes in response to centrifugal force, pins carried by said weights, a ring having slots in which said pins fit to move all of the pivoted vanes in unison and resilient means urging said ring in one direction.

2. A hydraulic torque converter comprising a vaned impeller and a vaned rotor forming a liquid circuit, a set of relatively fixed vanes at the inlet end of the impeller, a set of eccentrically pivoted vanes at the outlet end of the impeller to change the impeller discharge angle, a plurality of weights eccentrically connected to said pivoted vanes to tilt the vanes in response to centrifugal force, means interconnecting the vanes for simultaneous movement and means communicating with spaced points in said liquid circuit and connected to the interconnecting means and operable in response to the flow of liquid in said circuit to exert a tilting force on the vanes.

3. A hydraulic torque converter comprising a vaned impeller and a vaned rotor forming a liquid circuit, a set of pivoted vanes at the outlet end of the impeller, a plurality of weights eccentrically connected to said pivoted vanes to tilt the vanes in response to centrifugal force, resilient means opposing said weights, a cylinder secured to the impeller, a piston in said cylinder operably connected to said pivoted vanes, and pipes connected to the opposite ends of the cylinder and projecting into said liquid circuit and opening in opposite directions whereby said piston will exert a tilting force on the vanes proportional to the rate of flow of liquid in the circuit.

4. In a hydraulic torque converter, a rotatable casing member, a plurality of vanes pivotally carried by said casing member, and a plurality of supplemental vanes pivotally mounted on said first named vanes respectively on axes at angles to the pivotal axes of the first named vanes and movable into engagement with said casing member to prevent passage of liquid between the first named vanes and the casing member.

5. In a hydraulic torque converter, a rotatable casing member, a plurality of vanes pivotaly carried by said casing member on axes at right angles to the casing member wall, and a plurality of supplemental vanes pivotally mounted on said first named vanes respectively on axes at right angles to said first named axes.

6. In a hydraulic torque converter a rotatable casing member, a plurality of vanes pivotally mounted on said casing member, a second set of vanes pivotally secured to the free ends of said first named vanes, and a set of supplemental vanes pivotally mounted on said second set of vanes on axes at angles to the pivotal axes of the second set of vanes and movable into engagement with the casing member to prevent passage of liquid between the first named vanes and the casing member.

ADIEL Y. DODGE.